(12) United States Patent
Min et al.

(10) Patent No.: US 7,695,857 B2
(45) Date of Patent: Apr. 13, 2010

(54) ELECTRODE ASSEMBLY FOR LITHIUM ION SECONDARY BATTERY AND LITHIUM ION SECONDARY BATTERY USING THE SAME

(75) Inventors: Jae Yun Min, Yongin-si (KR); Won Chull Han, Yongin-si (KR); Jin Hee Kim, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1058 days.

(21) Appl. No.: 11/384,500

(22) Filed: Mar. 21, 2006

(65) Prior Publication Data

US 2006/0222934 A1    Oct. 5, 2006

(30) Foreign Application Priority Data

Mar. 23, 2005    (KR) .................... 10-2005-0024237

(51) Int. Cl.
*H01M 2/18* (2006.01)
*H01M 2/26* (2006.01)

(52) U.S. Cl. .................. 429/142; 429/94; 429/130; 429/161

(58) Field of Classification Search ............ 429/94, 429/130, 161
See application file for complete search history.

(56) References Cited

U.S. PATENT DOCUMENTS

| 5,631,102 A | * | 5/1997 | Spillman et al. | ............... 429/94 |
| 5,843,594 A | * | 12/1998 | Cheong et al. | ................ 429/94 |
| 6,432,586 B1 | * | 8/2002 | Zhang | ........................ 429/251 |

FOREIGN PATENT DOCUMENTS

JP  10-302842  11/1998
JP  2002-324570  11/2002

* cited by examiner

*Primary Examiner*—Dah-Wei D Yuan
*Assistant Examiner*—Amanda Barrow
(74) *Attorney, Agent, or Firm*—Stein McEwen, LLP

(57) ABSTRACT

A lithium ion secondary battery and a jelly-roll type electrode assembly in a lithium ion secondary battery including a can and a cap assembly together with the electrode assembly. The electrode assembly is made up of two electrodes; a ceramic separator coating on at least one surface among the four surfaces of the two electrode plates and located between the two opposing electrodes; and porous polymer resin separation films placed between the electrode plates at certain locations where the plates are bent to relatively small radii of curvature and outward from an innermost portion of a core, and/or at terminal ends of the electrode plates, respectively.

18 Claims, 4 Drawing Sheets

ELECTRODE ASSEMBLY FOR LITHIUM ION SECONDARY BATTERY AND LITHIUM ION SECONDARY BATTERY USING THE SAME

CROSS-REFERENCE TO RELATED APPLICATIONS

This application claims the benefit of Korean Application No. 2005-24237, filed Mar. 23, 2005, in the Korean Intellectual Property Office, the disclosure of which is incorporated herein by reference.

BACKGROUND OF THE INVENTION

1. Field of the Invention

Aspects of the present invention relate to a lithium ion secondary battery, and more particularly to an electrode assembly for a lithium ion secondary battery having ceramic separation films and a typical isolation film.

2. Description of the Related Art

A secondary battery is a rechargeable battery which has such a high capability that its volume can be reduced and its capacity can be increased. Recently, as demand for portable electronic devices, such as camcorders, portable computers, portable phones, and the like, has increased, various secondary batteries, used as electric power sources for these portable electronic devices, have been researched and developed. Such representative secondary batteries which have been developed and used include nickel hydrogen batteries, lithium ion batteries, lithium ion polymer batteries, and the like.

Lithium, used as a material in some secondary batteries, is suitable for making batteries having a large capacity per unit mass, because among other reasons, the Li atoms are small and mobile. On the other hand, since the lithium reacts with water, anhydrous electrolytes are used for lithium based-batteries. In this case, since the lithium is not subjected to an effect of voltage due to the electric resolution of water, the lithium based-batteries can generate electromotive forces to the extent of 3 to 4 volts.

The anhydrous electrolyte used for the lithium ion secondary battery generally includes a liquid phase electrolyte and a solid phase electrolyte. The liquid phase electrolyte is obtained by dissociating a lithium salt in an organic solvent. Carbonate containing alkyl groups such as ethylene carbonate and propylene carbonate or organic compounds similar to the carbonates are used as the organic solvent.

However, the ion conductance of the electrolyte is low in the lithium ion secondary battery. The lower ion conductance of the electrolyte can be overcome by expanding an area of an active material on each of the electrodes and enlarging the opposing surfaces of two electrodes.

The enlargement of opposing surfaces of the electrodes is limited by various factors. In the end, the lower ion conductance of the electrolyte allows the impedance in the battery to increase, thereby causing a greater drop in the inner voltage. Specifically, the lower ion conductance of the electrolyte serves as a primary factor to restrain electric current of the lithium ion secondary battery, thereby limiting the output of the lithium ion secondary battery, even when large current discharge is required.

In addition, a separator also is a primary factor in restricting the movement of the lithium ions between the two electrodes. If the separator existing between the two electrodes does not have enough transmittance and wettability for the electrolyte, the separator restricts the movement of the lithium ions between the two electrodes, so that the electric characteristic of the lithium secondary battery is degraded.

Therefore, important characteristics of the separator relating to the performance of the lithium secondary battery include the heat resistance, the resistance to heat distortion, the chemical resistance, the mechanical strength of the separator, a separator aperture, (a cavity area per unit volume or a porosity in a certain section of the separator), and the wettability to the electrolyte.

Furthermore, the separator of the lithium ion battery plays a role as a safety device for preventing the lithium secondary battery from overheating. The polyolefin based, finely porous film, usually used as a material for the separator, is softened and partially melted when the temperature of the lithium battery rises over a predetermined point due to a malfunction of the lithium battery whereupon the fine apertures of the porous film which serve as passage ways for the electrolyte and the lithium ions are squeezed shut. The movement of the lithium ions is thus interrupted and the flow of the electric current in/outside the lithium secondary battery is stopped, so that the increase in temperature of the lithium secondary battery caused by the electric current is halted.

Where the temperature of the lithium secondary battery suddenly rises because of a certain reason, i.e. external thermal transition, etc., and the increase of the temperature of the lithium secondary battery continues for a certain time even though the fine apertures of the separator are sealed, then the separator can be damaged. Specifically, a part of the separator is melted, at which point the two electrodes of the lithium secondary battery may be in direct contact with each other so as to cause an internal short circuiting. Further, the separator may shrink, thereby allowing the two electrodes to make contact with each other and cause further short circuiting. This short circuiting in the lithium secondary battery is very damaging to the lithium secondary battery and dangerous.

In addition, as the lithium secondary battery has a large capacity, a great amount of electric current can flow in the lithium secondary battery in a short time. In this case, when over-current flows in the lithium secondary battery, additional heat is generated that does not dissipate easily contributing to continued melting of the separator, even though the fine apertures of the separator are closed so as to interrupt the flow of the electric current through that path. So there is an increasing possibility of damaging the separator to cause or exacerbate the short circuiting in the lithium secondary battery.

In this circumstance, although it is important to shut the apertures of the separator, it is more important to prevent the melting or shrinking of the separator when the lithium secondary battery is overheated. Specifically, to prevent the internal short circuiting between the electrodes due to an unstable separator even at a relatively high temperature (more than 200° C.), a ceramic separator, which is a porous film made of a mixture of particles of ceramic filler and binding agent, can be used as the separator.

FIG. 1 is a perspective view showing a conventional electrode assembly to which a ceramic film playing the role of a separator is applied. The electrode assembly 100 to which the conventional porous separation film is applied, includes an anode electrode plate 110, a cathode electrode plate 120, and a ceramic film 130. The anode electrode plate 110 is formed by coating a desired region of an anode current collector with an anode active material layer, while the cathode electrode plate 120 is formed by coating a desired region of a cathode current collector with a cathode active material layer. The ceramic film 130 is coated on the anode and cathode electrode plates 110 and 120, so as to prevent a short circuiting between the anode and cathode electrode plates 110 and 120 and to play the role of a separator to allow only lithium ions to move. The electrode assembly 100 is wound in a jelly-roll shape.

Lithium oxides such as $LiCoO_2$, $LiMn_2O_4$, $LiNiO_2$, and $LiMnO_2$ are used as the anode active material. Further, carbon based-materials, Si, Sn, tin oxide, composite tin alloys, and transition metal oxides are used as the cathode active material.

The anode current collector of the anode electrode plate 110 is made of aluminum material. The cathode current collector of the cathode electrode plate 120 is made of copper. The separator 130 is usually made in such a manner that ceramic particles are uniformly dispersed in the mixture of binder and solvent so as to form a solution for a porous film and then the electrode plate which is formed by coating a current collector with the active material is dipped in the solution for the porous film. Zirconium oxide, alumina, silica, and mixtures thereof are used as the ceramic material.

In the case of a polygonal battery to which the separator is applied, exfoliation of the ceramic separator occurs at bent portions of the leading edge of the electrode plate in the jelly-roll type electrode assembly, thereby readily causing a short circuit. In addition, in the case of the polygonal or cylindrical battery to which the ceramic separator is applied, since the exfoliation of the ceramic separator may occur at both ends of the electrode plate at which an uncoated portion is formed, there is the danger of causing a short circuit.

In the case of the battery to which the conventional ceramic separator is applied, in order to prevent the occurrence of the short circuiting, a polyethylene film or a polypropylene film (hereinafter, referred to as the existing separation film) has been inserted between boundary surfaces of the anode and cathode electrodes. As a result, the electrode assembly becomes thick. Therefore, the length of the electrode plate must be reduced. Moreover, the resistance of the electrode plate increases and makes it difficult for the lithium ions to move smoothly.

SUMMARY OF THE INVENTION

Accordingly, aspects of the present invention have been made to solve the above-mentioned and/or other problems occurring in the prior art. Aspects of the invention provide a lithium ion secondary battery, in which an electrode assembly does not become thick even though an existing separation film is used in the electrode assembly, and to which a ceramic separator is applied so as to prevent an increase of resistance.

Another aspect of the present invention is to provide a lithium ion battery which has electrode plates of which the length is kept in spite of inserting an existing separation film between the electrode plates and which has a ceramic separator capable of preventing the reduction of the capacity of the lithium ion battery due to the insertion of a separation film.

According to an aspect of the invention, there is provided a jelly-roll type electrode assembly in a lithium ion secondary battery including a can and a cap assembly together with the electrode assembly, which comprises: two electrodes; a ceramic separator formed on at least one surface among the four surfaces of the two electrodes and disposed between the two opposing electrodes; and porous polymer separation films interposed between the two opposing electrodes at portions of the electrodes which have relatively small radii of curvature near an innermost portion of an electrode assembly core.

According to aspects of the present invention, the electrode assembly includes plane surface portions and curved surface portions connecting the plane surface portions, and the porous polymer separation films (hereinafter referred to as porous separation films), are disposed at the curved surface portions.

According to aspects the present invention, the porous separation films interposed between the electrodes at the innermost portions of the electrode assembly include at least four porous separation films.

According to aspects of the present invention, more porous separation films than required to separate 40% of a winding number of the two electrodes of the electrode assembly are interposed between the two opposing electrodes from the innermost portion of the core outward.

According to an aspect of the present invention, the porous separation films are formed to extend toward the core beyond a terminal portion of the electrodes including the portions having a minimum radius of curvature around the innermost portion of the core.

According to an aspect of the present invention, the porous separation films surround the terminal portion of the electrodes extending toward the core of the electrode assembly.

According to an aspect of the present invention, the porous separation films are formed at all of the portions having the relatively small curvature from the innermost core outward.

According to an aspect of the present invention, the porous separation films may be formed between the terminal portions of the opposing electrodes which are positioned at an outermost portion of the jelly-roll electrode assembly. According to an embodiment of the invention, the porous separation films are made of polyethylene or polypropylene.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
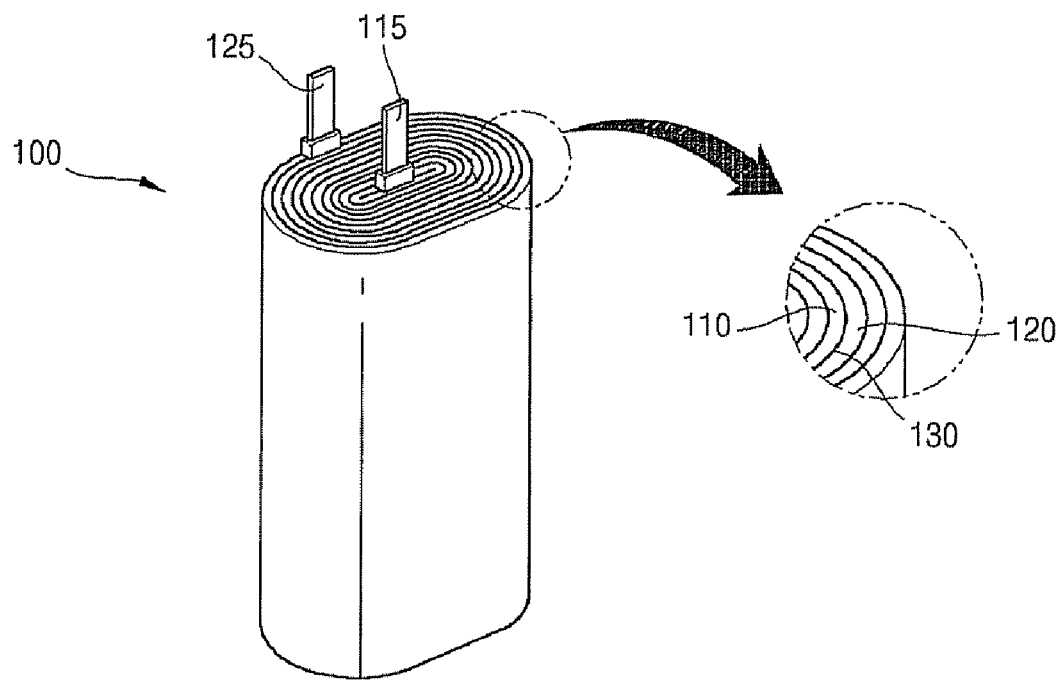
FIG. 1 is a perspective view showing a conventional electrode assembly having a ceramic separation film.
Figure 2:
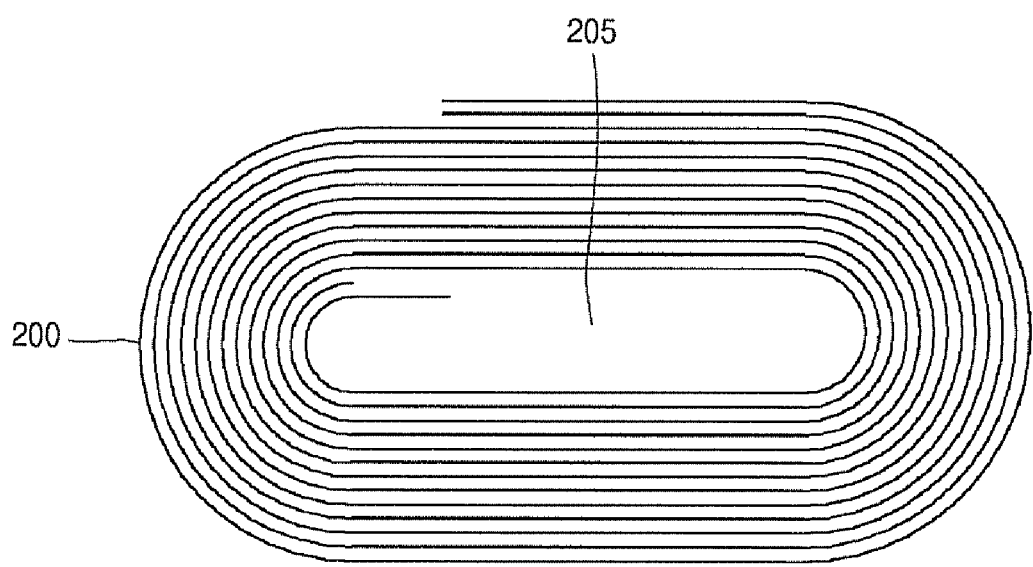
FIG. 2 is a sectional view showing the conventional electrode assembly having a porous film inserted therein.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
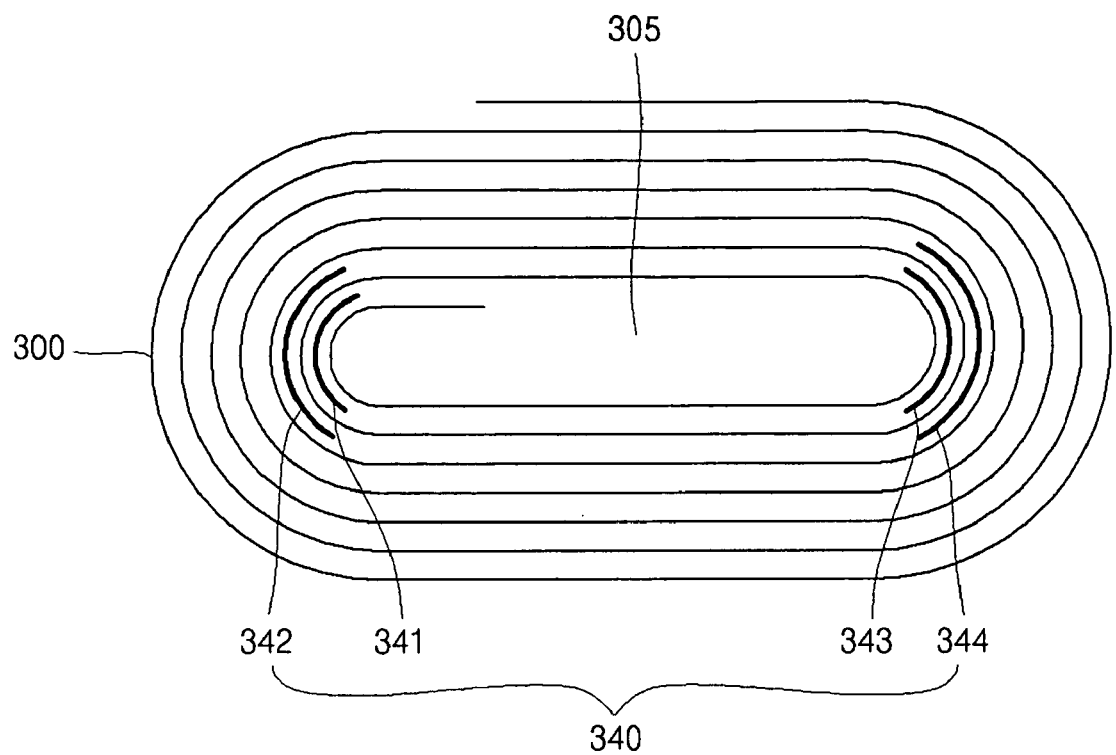
FIG. 3 is a sectional view of an electrode assembly according to an embodiment of the present invention.
Figure 4:
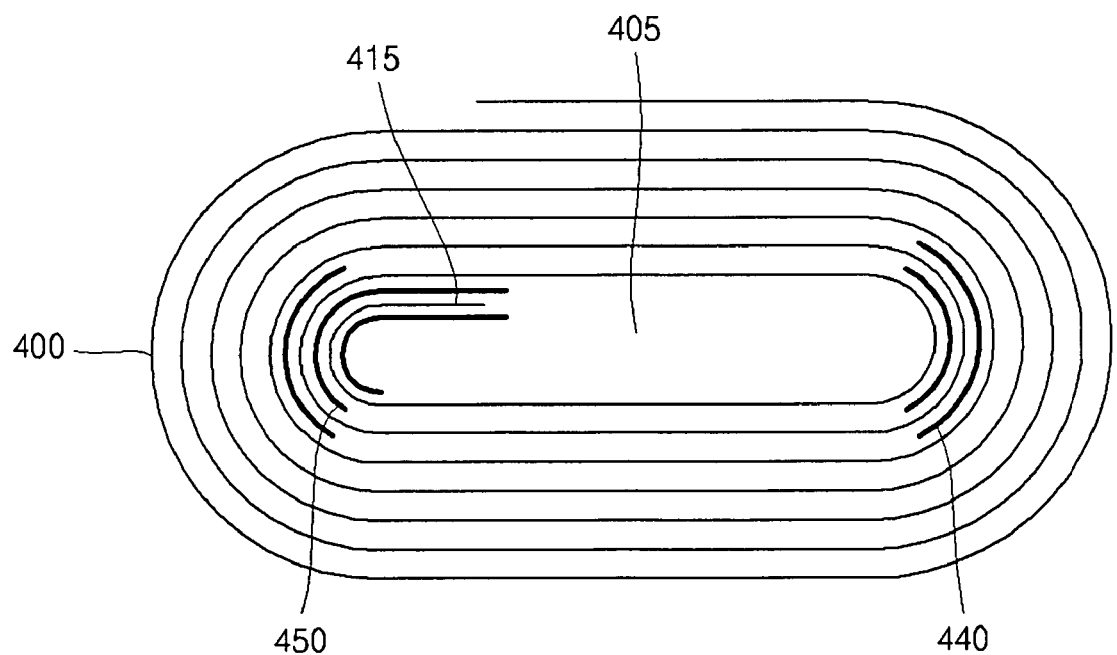
FIG. 4 is a sectional view of an electrode assembly according to another embodiment of the present invention.
Figure 5:
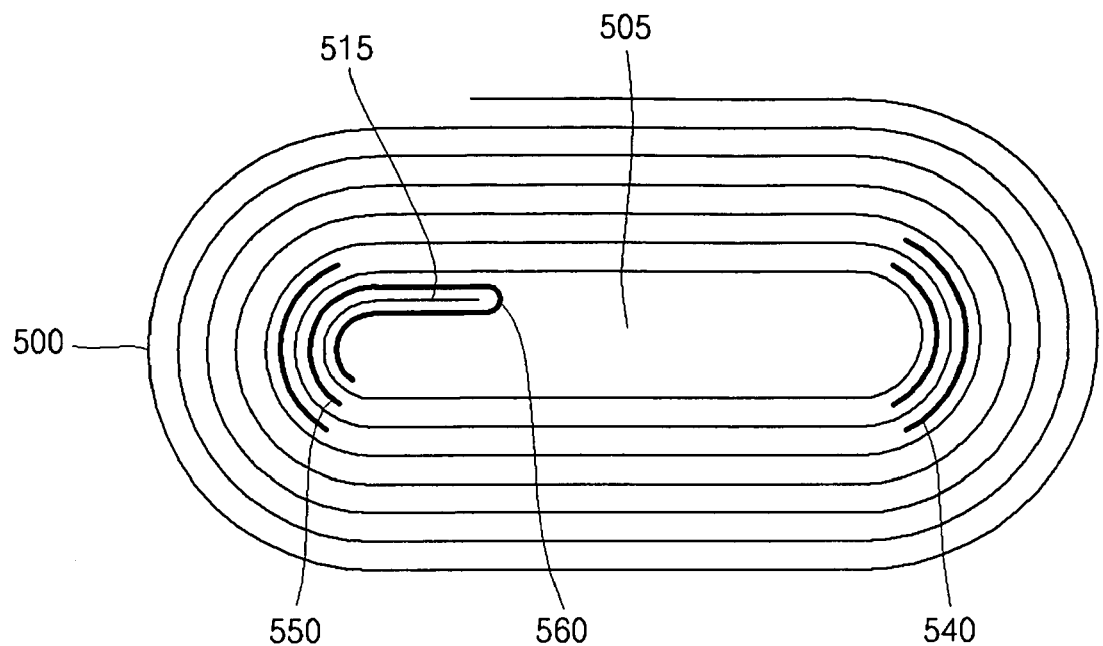
FIG. 5 is a sectional view of an electrode assembly according to still another embodiment of the present invention.
Figure 6:
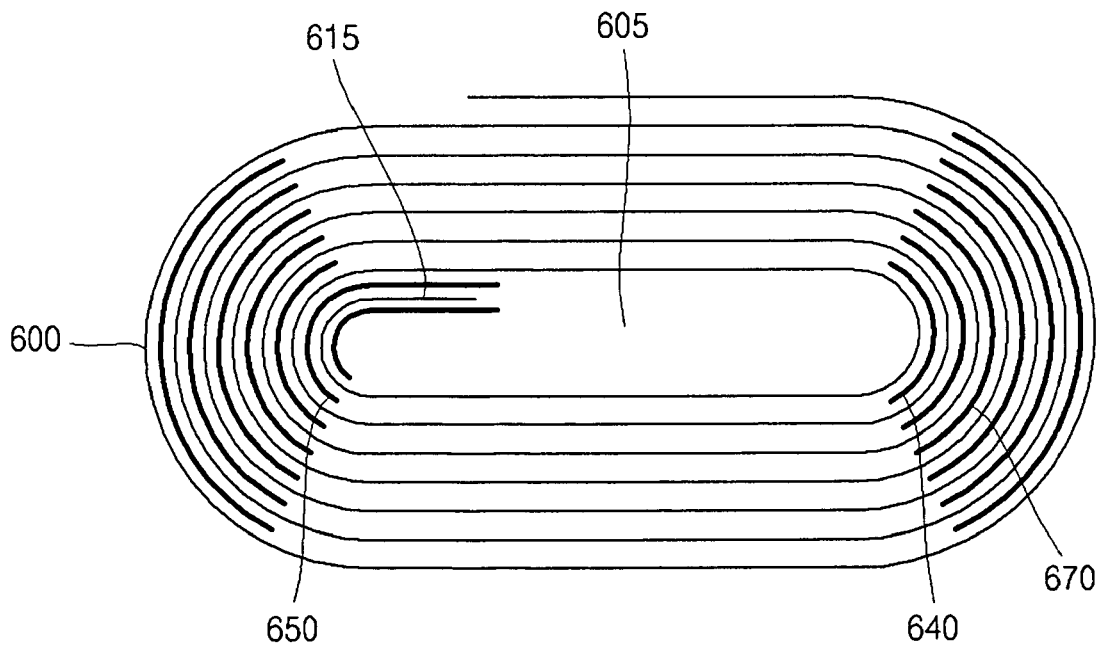
FIG. 6 is a sectional view of an electrode assembly according to still another embodiment of the present invention.
Figure 7:
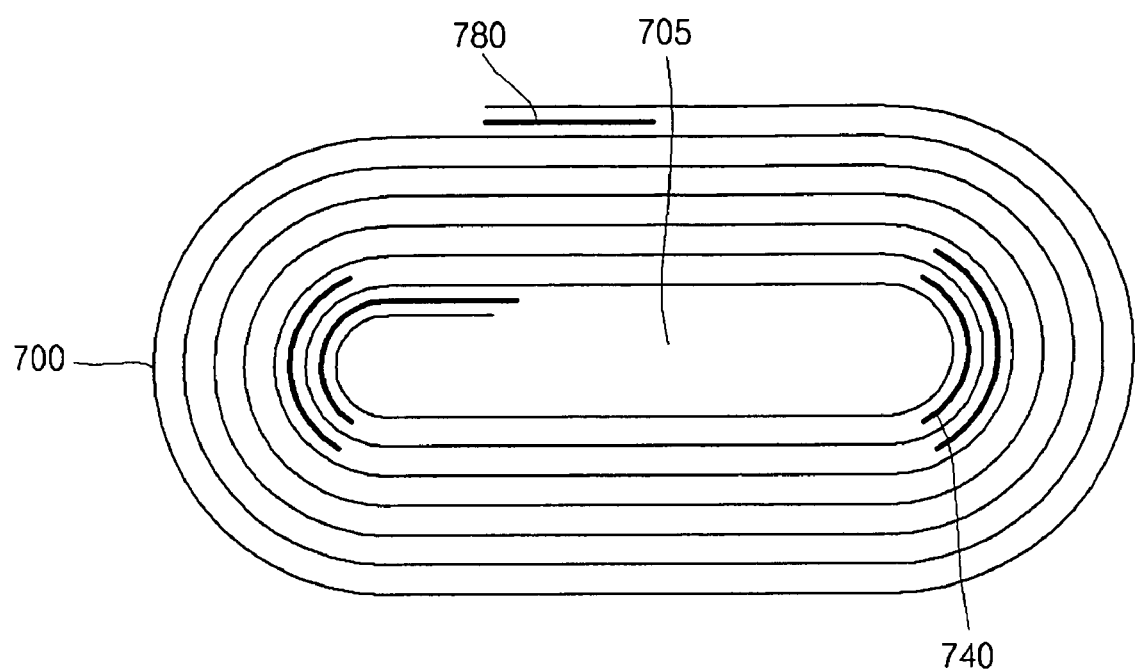
FIG. 7 is a sectional view of an electrode assembly according to still another embodiment of the present invention.

FIG. 3 is a sectional view of an electrode assembly according to an embodiment of the present invention. FIG. 4 is a sectional view of an electrode assembly according to another embodiment of the present invention. FIG. 5 is a sectional view of an electrode assembly according to still another embodiment of the present invention. FIG. 6 is a sectional view of an electrode assembly according to still another embodiment of the present invention. FIG. 7 is a sectional view of an electrode assembly according to still another embodiment of the present invention.

Aspects of the present invention can be understood by referring to the conventional electrode assembly 100 in FIG. 1 including an anode electrode plate 110, a cathode electrode plate 120, and a ceramic film 130. The anode electrode plate 110 is formed by coating a desired region of an anode current collector with an anode active material layer, while the cathode electrode plate 120 is formed by coating a desired region of a cathode current collector with a cathode active material layer. The ceramic film 130 is coated on the anode and cathode electrode plates 110 and 120, so as to prevent a short circuiting between the anode and cathode electrode plates 110 and 120 and to play the role of a separator to allow only lithium ions to move between the plates. The electrode assembly 100 is wound in a jelly-roll shape.

Lithium oxides such as $LiCoO_2$, $LiMn_2O_4$, $LiNiO_2$, and $LiMnO_2$ are used as the anode active material. Further, carbon based-materials, Si, Sn, tin oxide, composite tin alloys, and transition metal oxides are used as the cathode active material.

The anode current collector of the anode electrode plate 110 is made of aluminum material. The cathode current collector of the cathode electrode plate 120 is made of copper. The ceramic film 130 is usually made in such a manner that ceramic particles are uniformly dispersed in a mixture of binder and solvent so as to form a solution for a porous film and then the electrode plate which is formed by coating a current collector with the active material is dipped in the solution for the porous film. Zirconium oxide ($ZrO_2$), alumina ($Al_2O_3$), silica ($SiO_2$), and mixtures thereof may be used for ceramic material.

Referring to FIG. 3, an electrode assembly 300 according to an aspect of the present invention includes a ceramic separator formed on at least one of four surfaces of the electrode plates, which is located between two opposing electrode plates of the electrode assembly, and separate porous separation films 340 disposed at portions of the electrode assembly having a relatively small radius of curvature due to proximity to the innermost portion of the core 305. Furthermore, the electrode assembly 300 has plane surface portions and curved surface portions connecting one plane surface portion to another plane surface portion, in which the porous separation films 340 can be interposed between the curved surface portions. More specifically, the porous separation films 340 arranged from the innermost curved portions of the electrode assembly outward includes at least four porous separation films 341, 342, 343, and 344. More porous separation films 340 than required to separate 40% of the windings of the electrode assembly 300 may be disposed between the electrodes from the innermost curved surface portion of the electrode assembly outward. At this time, the portions of the electrode assembly where the porous separation films 340 are placed correspond to the portions of the electrode assembly upon which the ceramic separator is formed, where the portions have the relatively small radius of curvature about the core 305. The portions having the smallest radius of curvature have undergone the greatest extent of bending. Therefore, when the electrode assembly is wound, there is a concern that the active material of the electrode plates and the ceramic coating may exfoliate from the current collector so as to expose the electrodes and cause a short circuit. Thus, the electrode assembly is made in such a manner that porous separation films are disposed between the electrodes at least at the two innermost windings of the electrode assembly in order to prevent the short circuiting at the bent portions near the innermost portion of the electrode assembly. The polyethylene or polypropylene resin used for the existing separation film is suitable for the material of the porous separation films.

FIG. 4 is a sectional view showing an electrode assembly according to another embodiment of the present invention.

Referring to FIG. 4, the electrode assembly 400 according to an aspect of the present invention includes porous separation films 450 inserted therein so as to pass by a terminal portion 415 of an electrode plate and be located at portions of the electrode plates having relatively small radii of curvature about the core 405 in a direction toward the core 405. At the terminal portion 415 of the electrode plate directed to the core, there is a significant concern that an active material and a coated ceramic material may exfoliate from the current collector so as to cause a short circuit. In order to prevent the short circuiting from occurring at the terminal portion of the electrode plate directed to the core, the porous separation films 450 are formed to extend toward the core 405 beyond the terminal portion 415 of the electrode plate in addition to the porous polymer separation films 440 between electrode assembly portions with relatively small radii of curvature. In an embodiment of the invention, porous polymer separation films 450 extend beyond the terminal portion of the electrode plate on both the surface toward the core 405 and the surface between the innermost winding and next to last innermost winding of the electrode assembly.

FIG. 5 is a sectional view of an electrode assembly according to another embodiment of the present invention.

Referring to FIG. 5, the electrode assembly 500 according to an aspect of the present invention, includes porous separation films 560 which are inserted in the electrode assembly so as to pass by a terminal portion 515 of an electrode plate in addition to the porous separation films 540 and 550 located at the portions of the electrode assembly with relatively small radii of curvature in a direction toward the core. In an embodiment of the invention, the porous separation films 560 are continuous with each other near the core so as to surround the terminal portion 515 of the electrode plate. At the terminal portion 515 of the electrode plate directed to the core rather than at another portion of the electrode plate, there is a significant concern that the active material of the electrode and the ceramic coating may exfoliate from the current collector so as to cause a short circuit. Therefore, in order to prevent the short circuit from occurring at the terminal portion 515 of the electrode plate directed to the core, porous separation films 550 are formed to pass by the terminal portion 515 of the electrode plate, which is directed to the core including portions with the smallest relative radii of curvature. The porous separation films 560 are connected with each other near the core, thereby surrounding the terminal portion 515 of the electrode plate.

FIG. 6 is a sectional view of an electrode assembly according to still another embodiment of the present invention.

Referring to FIG. 6, the electrode assembly 600 according to an embodiment of the present invention has porous separation films 650 inserted into all curved portions of the electrode assembly 670 having a relatively small radius of curvature about a core 605. There is a higher possibility that an active material and a coated ceramic material may exfoliate from a current collector so as to expose the electrode, causing short-circuiting, in the portions with the relatively small radii of curvature, including the portions with the minimum radius of curvature about the core 605 than in the other portions of the electrode plate.

The possibility of the generation of the short circuit at the portions having the relatively small radii of curvature is lower than that at the portion having the minimum radius of curvature. However, in order to realize a safer battery, porous separation films 640 and 650 are formed throughout portions 670 having relatively small radii of curvature about the core and portions having the minimum radius of curvature about the core. The porous separation films 650 are inserted between the electrode plates and pass by the terminal portion 615 of the electrode plate directed to the core 605 and include portions of the electrode assembly with the minimum radius of curvature. According to an embodiment of the invention, the porous separation films 650 are also connected to each other near the core 605 so as to surround the terminal portion 615 of the electrode plate.

FIG. 7 is a sectional view of an electrode assembly according to still another embodiment of the present invention.

Referring to FIG. 7, the electrode assembly 700, according to an aspect of the present invention, includes a porous separation film 780 inserted between terminal portions of both electrode plates located at the outermost portion of the jelly-roll type electrode assembly 700 in addition to the porous separation films 740 inserted into the electrode assembly according to previous descriptions of embodiments of the present invention. At the terminal portion of both electrode plates located at the outermost portion of the jelly-roll type electrode assembly, there is a significant concern that an active material and ceramic coating material of the electrode plate may exfoliate from a current collector to expose the electrode and generate a short circuit. Therefore, the porous separation films 780 are formed between the terminal portions of both electrode plates located at the outermost portion of the jelly-roll type electrode assembly, in addition to the porous separation films 740 according to the previous descriptions of embodiments of the present invention.

An embodiment of the present invention may be applied to a cylindrical battery in addition to the polygonal battery as described above. However, since an electrode assembly of a cylindrical battery does not have bent portions such as in the jelly-roll type electrode assembly, an aspect of the present invention provides that the porous separation films are inserted at the portions of the electrode assembly having the relatively small radii of curvature and portions of the electrode assembly having the minimum radius of curvature about the core of the electrode assembly. It is understood that previously described aspects of the invention as applied to the polygonal battery can also be applied to the cylindrical battery.

Aspects of the invention provide a lithium ion secondary battery having an electrode assembly according to an embodiment of the present invention including the embodiments described above. The lithium ion secondary battery includes an electrode assembly which has an anode electrode plate coated at a predetermined region on at least one surface thereof with an anode active material layer, a cathode electrode plate coated at a predetermined region on at least one surface thereof with a cathode active material layer, and a ceramic separator disposed between the anode electrode plate and the cathode electrode plate so as to prevent the short circuiting of the anode and cathode electrode plates and to allow only the movement of lithium ions, a porous separation film disposed between and/or surrounding the electrode plates at certain locations to prevent exfoliation, a can for the lithium secondary battery which receives the electrode assembly, and electrolyte injected into the can for the lithium secondary battery so as to enable the lithium ions to move.

The electrode assembly includes the anode electrode plate, the cathode electrode plate, and the separator.

The anode and cathode electrode plates respectively have a current collector and the active material layer. The active material layer is manufactured in a slurry state in which a conductive material and a binding agent are mixed with an organic solvent and coated on the current collector. Therefore, the anode active material and cathode active material are adhered by the binding agent included therein to the respective current collectors so as to form the active material layers.

The separator is formed according to combinations of the ceramic film and porous separation films. The ceramic film is made such that ceramic particles are uniformly dispersed in a mixture of a binder and a solvent so as to form a solution for a porous film and then the electrode is dipped in the solution for the porous film or the solution is applied to the surface of the electrode having the active material layer. Polyethylene and polypropylene resin are suitable for the porous polymer separation films. The separator is formed according to the descriptions of the embodiments above and in FIGS. 3-7.

A cap plate is made from a metal plate having dimensions and shape corresponding to an opening at an upper end of the can. The cap plate has a thru-hole formed at the center portion thereof with a predetermined size, through which an electrode terminal is inserted. The electrode terminal has a tube type gasket mounted on a periphery thereof in order to insulate the electrode from the cap plate when the electrode terminal is inserted into the thru-hole, which is inserted along the gasket into the thru-hole of the cap plate. An opening for an injection of the electrolyte is formed at a side of the cap plate so as to have a desired size. After the cap assembly is assembled at the upper opening with the can, the electrolyte is injected through the opening for the injection of the electrolyte into the can. Then, the opening for the injection of the electrolyte is sealed.

The can is generally made of aluminum or aluminum alloys in a deep-drawing manner. The can has a substantially plane surface at a bottom thereof.

Hereinafter, the operation of the lithium secondary battery including the electrode assembly according to aspects of the present invention will be described.

Referring to FIGS. 3 through 7, in the electrode assembly according to an embodiment of the present invention, the porous separation films are inserted at the portions of the electrode assembly having minimum radii of curvature about the core, the terminal portions of the electrode plates directed to the core, portions of the electrode assembly having relatively small radii of curvature, and other portions of the electrode assembly such as the terminal portions of both electrode plates which are located at the outermost portion of the jelly-role type electrode assembly, where there is a significant concern that the active materials and the ceramic coating material of the electrode plates may exfoliate from the current collectors to expose the electrodes so as to generate a short circuit. Therefore, even when the ceramic separator has exfoliated from an electrode plate at a particular site, a porous separation film at that site will still separate the electrodes from each other so as to prevent a short circuit.

In an electrode assembly of a lithium secondary battery according to aspects of the present invention, it is possible to solve the above mentioned problems regarding a secondary battery which includes only a ceramic separator, i.e., the possibility of the occurrence of the short circuit between the electrode plates. Moreover, it is possible to solve the above mentioned problems in the secondary battery in which the conventional porous separation films are disposed between boundaries of the anode and cathode electrodes, i.e., the increases in the thickness and resistance of the electrode assembly.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An ovoid jelly-roll type electrode assembly in a lithium ion secondary battery including a can and a cap assembly together with the electrode assembly, the electrode assembly having curved portions and a planar central portion disposed between the curved portions, the electrode assembly comprising:
    two electrodes having outer terminal portions disposed on an outer surface of the electrode assembly, and inner terminal portions disposed at the core of the electrode assembly;
    a ceramic separator formed on at least one of the electrodes, so as to be disposed between opposing surfaces of the electrodes; and
    porous separation films disposed only at the curved portions of the electrode assembly, between the electrodes,
    wherein an innermost one of the porous separation films extends into the central portion of the electrode assembly.

2. The electrode assembly for a lithium ion secondary battery as claimed in claim 1, wherein at least four of the porous separation films are interposed between five innermost layers of the electrodes assembly.

3. The electrode assembly for a lithium ion secondary battery as claimed in claim 1, wherein the porous separation films are disposed between more than 40% of the layers of the electrode assembly.

4. The electrode assembly for a lithium ion secondary battery as claimed in claim 1, wherein the innermost porous separation film extends beyond the inner terminal portions of the electrodes.

5. The electrode assembly for a lithium ion secondary battery as claimed in claim 4, wherein the innermost porous separation films surrounds the inner terminal portions of the electrodes.

6. The electrode assembly for a lithium ion secondary battery as claimed in claim 1, wherein the porous separation films are formed at the curved portions of the electrode assembly that have the smallest relative curvatures.

7. The electrode assembly for a lithium ion secondary battery as claimed in a claim 1, further comprising a porous separation films disposed between the outer terminal portions of the electrodes.

8. The electrode assembly for a lithium ion secondary batter as claimed in claim 1, wherein the porous separation films are made of polyethylene or polypropylene.

9. An ovoid jelly-roll type electrode assembly in a lithium ion secondary battery including a can and a cap assembly together with the electrode assembly, the electrode assembly having curved portions and a planar central portion disposed between the curved portions, the electrode assembly comprising:
    two electrodes that have outer terminal portions disposed on an outer surface of the electrode assembly, and inner terminal portions disposed at the core of the electrode assembly;
    a ceramic separator formed on at least one of the two electrodes and disposed between opposing surfaces of the electrodes; and
    porous separation films disposed only at the curved portions of the electrode assembly, between the electrodes, wherein an innermost one of the porous separation films extends into the central portion of the electrode assembly, past the inner terminal portions of the electrodes.

10. The electrode assembly for a lithium ion secondary battery as claimed in claim 9, further comprising a porous separation films disposed between the outer terminal portions of the electrodes.

11. The electrode assembly for a lithium ion secondary battery as claimed in claim 9, wherein the porous separation films are made of polyethylene or polypropylene.

12. A lithium ion secondary battery including an ovoid jelly-roll type electrode assembly, a can, and a cap assembly, the electrode assembly having curved portions and a planar central portion disposed between the curved portions, the electrode assembly comprising:
    two electrodes that have outer terminal portions disposed on an outer surface of the electrode assembly, and inner terminal portions disposed at the core of the electrode assembly;
    a ceramic separator formed on at least one of the electrodes and disposed between opposing surfaces of the electrodes; and
    porous separation films disposed only at the curved portions of the electrode assembly, between the electrodes, wherein an innermost one of porous separation films extends into the central portion of the electrode assembly, around the inner terminal portions of the electrodes, and back onto one of the curved portions of the electrode assembly.

13. The lithium ion secondary battery as claimed in claim 12, wherein at least four of the porous separation films are interposed between the five innermost layer of the electrode assembly.

14. The lithium ion secondary battery as claimed in claim 12, wherein the porous separation films are formed at the curved portions of the electrode assembly that have the relatively smallest radii of curvature.

15. The lithium ion secondary battery as claimed in claim 12, further comprising a porous separation film disposed between the outer terminal portions of the electrodes.

16. The lithium ion secondary battery as claimed in claim 12, further comprising a separation film disposed around the outer terminal portions of the electrodes.

17. A ovoid electrode assembly of a lithium ion battery, the electrode assembly having curved portions and a planer central portion disposed between the curved portions, the electrode assembly comprising:
    two opposing electrodes that have outer terminal portions disposed on an outer surface of the electrode assembly, and inner terminal portions disposed at the core of the electrode assembly;
    an active portion formed on each of the electrodes;
    a ceramic separator formed on at least one of the electrodes, so as to be between opposing surfaces of the electrodes; and
    porous separation films disposed between the electrodes, only at the curved portions of the electrode assembly, between the electrodes, to prevent exfoliation of the active portion and the ceramic separator, wherein
    an innermost one of porous separation films extends into the central portion of the electrode assembly, around the inner terminal portions of the electrodes, and back onto one of the curved portions of the electrode assembly.

18. The electrode assembly of claim 17, further comprising a porous separation film disposed between the outer terminal portions of electrodes.

* * * * *

UNITED STATES PATENT AND TRADEMARK OFFICE
CERTIFICATE OF CORRECTION

PATENT NO. : 7,695,857 B2  Page 1 of 1
APPLICATION NO. : 11/384500
DATED : April 13, 2010
INVENTOR(S) : Jae Yun Min et al.

It is certified that error appears in the above-identified patent and that said Letters Patent is hereby corrected as shown below:

Column 9, line 29, change "electrodes" to --electrode--;
Column 9, line 40, change "films" to --film--;
Column 9, line 48, change "films" to --film--;
*Column 9, line 51, change "batter" to --battery--.

Column 10, line 6, change "films" to --film--;
Column 10, line 45, change "planer" to --planar--.

Signed and Sealed this

Twenty-seventh Day of July, 2010

David J. Kappos
*Director of the United States Patent and Trademark Office*